Oct. 24, 1961 G. P. BUNN 3,005,317
COMBINATION DRY OR LIQUID CARGO VESSEL AND PROCESS
Filed Oct. 26, 1959 3 Sheets-Sheet 1

INVENTOR.
G. P. BUNN
BY Hudson & Young
ATTORNEYS

Oct. 24, 1961 G. P. BUNN 3,005,317
COMBINATION DRY OR LIQUID CARGO VESSEL AND PROCESS
Filed Oct. 26, 1959 3 Sheets-Sheet 2

INVENTOR.
G. P. BUNN
BY *Hudson & Young*
ATTORNEYS

INVENTOR.
G. P. BUNN
BY Hudson & Young
ATTORNEYS

United States Patent Office 3,005,317
Patented Oct. 24, 1961

3,005,317
COMBINATION DRY OR LIQUID CARGO VESSEL AND PROCESS
George P. Bunn, Bartlesville, Okla., assignor to Phillips Petroleum Company, a corporation of Delaware
Filed Oct. 26, 1959, Ser. No. 848,692
2 Claims. (Cl. 62—45)

This invention relates to a cargo vessel having a cargo hold with mechanical means for converting a suitable space for the storage and transport of volatile liquids and liquefied gases to a suitable space for the storage and transportation of dry cargo. In another aspect, it relates to means for converting the cargo hold from dry storage to liquid storage space, or vice versa, in a minimum of time, with a minimum of work, and with minimum preparation of the space to receive the different types of cargo. In another aspect, it relates to a suitable refrigeration means for such a cargo vessel, which refrigeration lowers the vapor pressure of the liquid cargo to substantially atmospheric pressure thereby avoiding the use of high pressure tanks, and also preserves perishable, dry cargo from spoiling due to atmospheric temperature in said dry cargo space. In another aspect, it relates to processes of operating such vessels.

In the prior art of transporting cargoes by cargo vessels, considerable difficulty has risen because of the fact that the most profitable cargo to ship to a country may be a highly volatile liquid product which is incompatible with the most profitable or most readily available return cargo from that country, which may be a dry and perishable cargo. For example, there is a considerable demand for liquefied petroleum gas, hereinafter called L.P.G., in seaports where the chief products of the surrounding countryside is in the form of perishable, dry cargo which would be exchanged for the L.P.G. The L.P.G. comprises propane and/or butane in liquid form in preselected proportions from 0 to 100 percent of each. Other normally gaseous materials in this general boiling point range, such as anhydrous ammonia, can be transported also. The dry products may be dairy products, milk (in cans), butter, cheese, meat, bananas, or other natural or manufactured perishable, dry products which are more or less incompatible to the L.P.G. In some instances, for example meat, even traces of the L.P.G. would contaminate the dry cargo and render it valueless. In the prior art, it has therefore been the practice to employ separate cargo vessels for L.P.G. and for perishable, dry products, which is inefficient and results in twice as many vessels as necessary, and in each vessel making an unprofitable trip in one direction with its cargo hold empty. Attempts to steam out L.P.G. tanks and clean them up sufficiently to allow the transport of dry cargo have proved to take too much time, to be too expensive, and to involve a risk of explosion, and have not been successful in giving a reasonable degree of protection against accidental contamination with lingering traces of the L.P.G. None of the vessels of the prior art are provided with a suitable refrigeration means which will be equally suitable to the refrigeration of dry cargoes and to refrigerating liquid L.P.G. cargoes in the same cargo space at different times.

In the prior art, United States Patent 2,394,607 of February 12, 1946, to Gray et al., and its reissue, Re. 22,876 of May 13, 1947, discloses a ship suitable for low vapor pressure liquids, such as oil or gasoline, and dry nonperishable cargo only. It lacks refrigeration or any mechanical means for converting the cargo space.

In the present invention, the difficulties of the prior art are successfully avoided by the provision in the dry cargo hold of a flexible, impervious, collapsible tank for receiving the liquid cargo in its interior, and mechanical means to collapse said tank. Liquid L.P.G. can be contained inside this flexible, impervious tank which is expanded to fill the cargo space and therein, after the L.P.G. is discharged, the tank can be collapsed and the vacated space used as dry cargo space, without any possibility of contamination of the dry cargo with the remaining drops of L.P.G. inside of the tank. By employing refrigeration, the L.P.G. can be stored as substantially atmospheric pressure and perishable, dry cargoes are easily handled.

Another advantage of the present invention is that by not having to steam, purge, and dry the interior of the L.P.G.-containing tank, it is also unnecessary to allow any air to enter the tank, thereby reducing the danger of explosion which occurs whenever L.P.G. is flowed into a space containing air. This is an improvement over using an L.P.G. tank of ordinary construction for the transport of dry cargo, which would require filling the L.P.G.-containing space with air each time the dry cargo was to be shipped, with the attendant expense of cleaning and subsequent hazard of flowing L.P.G. into an air-containing space when it was again time to ship L.P.G.

One object of this invention is to provide a process for the transportation of highly volatile liquid cargo in one direction, and the transportation of dry cargo in the same space on the return voyage, or vice versa, without the necessity of steaming out and cleaning out the liquid cargo space, or loading liquid into an air-filled space.

Another object is to provide a liquid cargo tank with mechanical means to collapse it to provide a suitable dry cargo space.

Another object is to provide suitable refrigerating means for such a vessel, which is suitable for refrigerating the combination dry cargo and liquid cargo space of the present invention.

Various other objects and advantages will be apparent to those skilled in the art upon reading the accompanying drawings, specification and claims.

Figure 1:
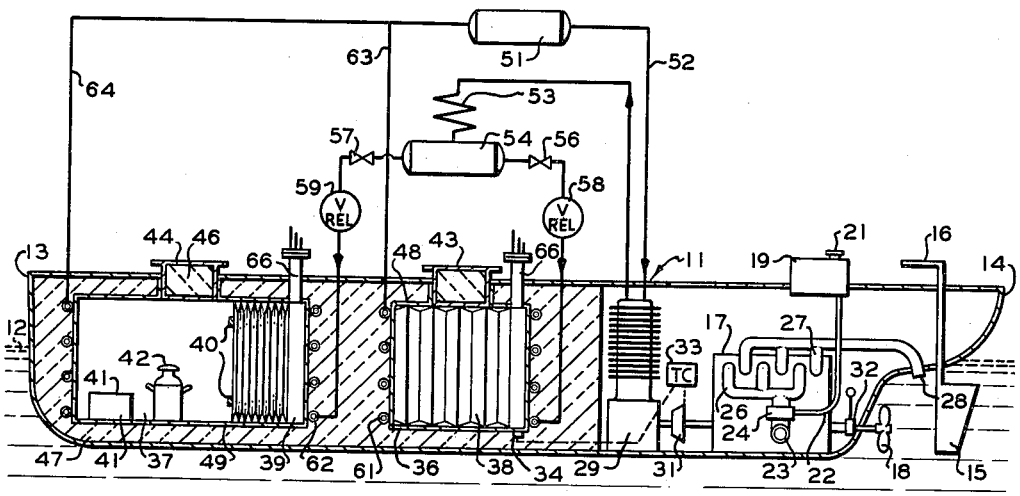
FIGURE 1 is a schematic cross-sectional view of a cargo vessel embodying the present invention.

In FIGURE 1, a cargo vessel embodying my invention generally designated as 11 is shown floating on the surface of a body of water 12. While the invention obviously has its greatest utility with reference to large cargo vessels, especially ocean going vessels, some of the advantages of the invention can also be applied to a smaller installation, and therefore the term "cargo vessel" as used herein should be understood to include automobile trucks, railroad cars, and other wheeled vehicles as shown by Arkoosh 2,630,236, March 3, 1953, as well as aircraft, air-borne vehicles, and water-borne vehicles such as barges, boats, ships, and the like.

Cargo vessel 11 is shown with a bow 13, a stern 14, rudder 15, tiller 16, and all the usual appurtenances of a cargo vessel or ship, including means to move the ship comprising a suitable engine 17 and screw propeller 18 driven thereby. Obviously, engine 17 could be any type of engine known in the prior art, such as a steam engine (not shown), but for purposes of illustration engine 17 is shown as an internal combustion engine having a liquid fuel tank 19 with filler cap 21, fuel line 22, air intake 23, carburetor 24, intake manifold 26, and exhaust manifold 27 leading to the underwater exhaust 28.

In order to provide refrigeration when refrigeration is desired, it is necessary to have a source of power which can also be provided by engine 17 which is disposed and adapted to drive refrigerant compressor 29 through clutch 31 when said clutch is engaged. A second clutch 32 may be provided to disengage screw propeller 18 from engine 17 whenever it is desired to manually disengage the same. The engagement of clutch 31 is preferably under the completely automatic control of a temperature controller 33 in response to the temperature of a suitable thermostat 34 which is placed in a heat insulated position in or adjacent to the cargo space 36.

The number of cargo spaces may vary from 1 to a large number; however, for illustrative purposes only two cargo spaces 36 and 37 are shown in FIGURE 1, the two cargo spaces being substantially the same, although of course one may be larger than the other if desired. The only real difference in FIGURE 1 is that cargo space 36 is filled with an expanded, impervious bag of pliable material 38 (shown in elevation) containing a liquid cargo, such as L.P.G., whereas in cargo space 37 the pliable, impervious bag 39 has been folded and pushed back out of the way by mechanical folding means of the type shown in FIGURES 5 or 6, having transverse pulling bars 40 similar to bars 112 to 115 of FIGURE 5, or similar to bar 121 of FIGURE 6, in order to provide suitable dry cargo space for such items as a box 41, which may contain butter, and container 42, which may be a milk can containing milk or cream.

The cargo spaces 36 and 37, respectively, are accessible through hatches closed with the usual hatch covers 43 and 44, respectively. In the preferred form of the invention, it is desired to provide refrigeration in order to maintain the liquid cargo liquid at less pressure and to preserve meat, bananas, and dairy products from deterioration, so the interior of hatch covers 43 and 44 is preferably lined with a suitable heat insulating material 46, such as balsa wood, cork, foam polystyrene plastic, glassware blocks, blocks of diatomaceous earth, or other heat insulating compounds known to the prior art. The same type of heat insulating material may be used as heat insulation 47 in the space surrounding cargo holds 36 and 37, said heat insulation 47 being of the desired thickness, and said heat insulation 47 may completely fill the hold of the ship outside of and in the immediate vicinity of said cargo holds 36 and 37 as shown in FIGURE 1 if it is light and contains air spaces. The walls of the cargo holds 36 and 37 can be formed of the insulation itself, although it is preferred to have them lined with steel lining plates 48 and 49, respectively, to form the floor and wall of the cargo hold so that the insulation will not be damaged during the placing and removal of the dry cargo 41 and 42. Plates 48 and 49 can be omitted if the heat insulation 47 is made of strong materials such as cork blocks provided the stevedores are careful in their loading and unloading. The liquid cargo inside of the pliable bags 38 or 39 will not injure the insulation 47 whether there is a lining plate 48 or 49, or none.

Flexible tanks 38 and 39 can be made from a number of suitable materials that are now available. For example, tank 38 can be made of a woven nylon skin 0.15 inch thick, water-proofed inside with oil-resistant acrylonitrile-butadiene rubber and outside with neoprene for abrasion and weather resistance, as reported in Chemical Week, June 20, 1959, page 87, column 3, as having been successfully used in a barge from England to Holland and back across the North Sea. However, as the flexible tanks 38 and 39 in the present invention are not subject to exposure to the sea, it is entirely feasible to use other materials which are less expensive. The Gray et al. patent cited above, column 1, line 50, to column 2, line 23, names several such suitable materials, as does U.S. Patent 2,696,185 of Snoddy of December 7, 1954, column 2, line 77 et seq.

The refrigeration system for the cargo holds 36 and 37 may comprise a compressor 29 driven by engine 17 through clutch 31, compressing any usual normally gaseous refrigerant, such as anhydrous ammonia, drawn in gaseous form from tank 51 through pipe 52, compressed in compressor 29, and then condensed in atmospheric condensing coils 53 to a liquid in tank 54. By opening the respective valve 56 or 57, the respective cargo hold 36 or 37 is refrigerated as the liquid ammonia expands through pressure relief valves 58 and 59 into refrigeration coils 61 and 62, respectively, evaporating therein, and thereby removing heat from the vicinity of cargo space 36 and 37, respectively, in the same manner regardless of whether they have a tank 38 full of liquid therein, or are full of dry cargo 41 and 42. The vaporized ammonia returns to tank 51 through conduits 63 and 64. This is known as a closed cycle refrigeration system as contrasted to cooling by evaporation only.

The refrigeration equipment could also be distributed in separate self-contained small units throughout the ship (not shown, but well known in the prior art), and if electrically driven compressors are used (not shown) they can be powered by an electrical generator (not shown) driven by motor 17, this electrical system being specially of value in case the cargo vessel is an electric drive ship (not shown).

Figure 5:
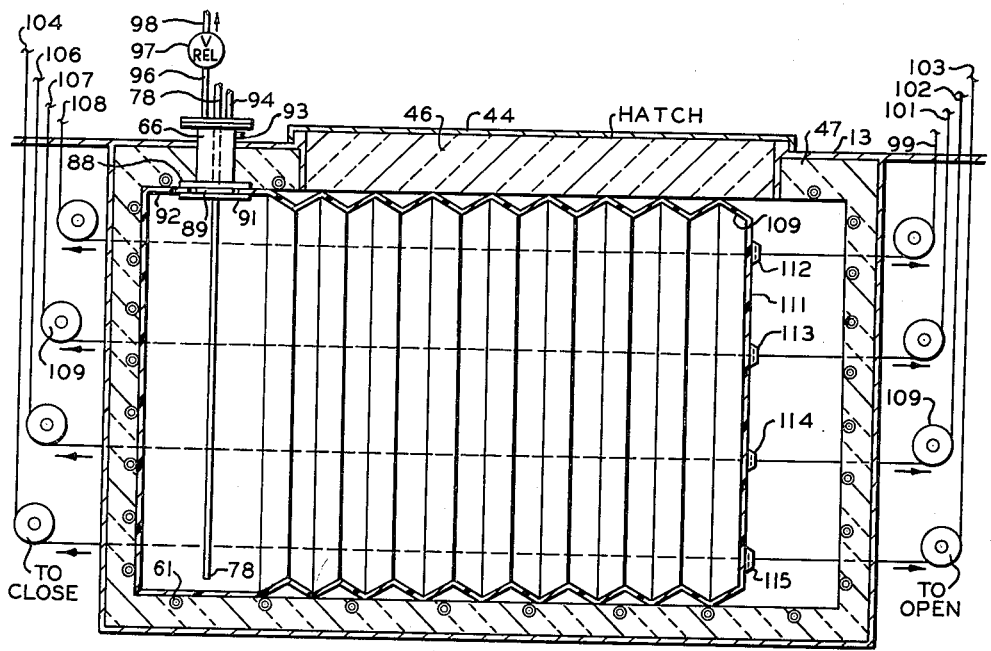
FIGURE 5 is a cross-sectional view of a fourth type of cargo hold.

The only entrance to the interior of flexible tanks 38 and 39 is through the filling and discharge head 66 which is shown in greater detail in FIGURE 5.

Figure 2:
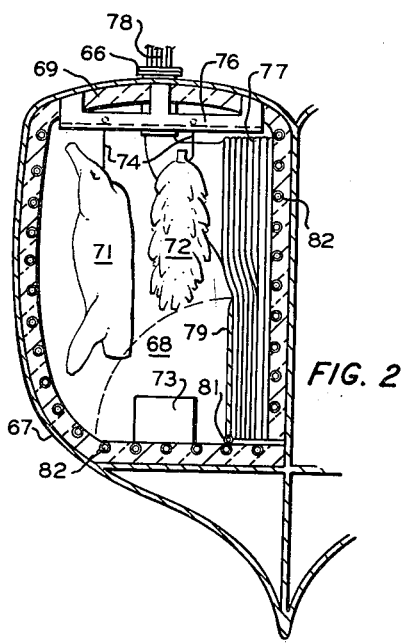
FIGURE 2 is a cross-sectional view taken at right angles to FIGURE 1 of a second modified form of cargo hold in a similar cargo vessel.

FIGURE 2 is a cross-sectional view taken at right angles to the plane of FIGURE 1 of a similar cargo vessel which is provided with a second modified form of cargo hold. Ship 67 has a hold 68 lined with heat insulation 69. Dry cargo, such as meat 71, bananas 72, and butter 73, is stored in the cargo hold 68. The meat and bananas 72 may be suspended on hooks 74 from the same overhead track 76 from which portions of a pliable, impervious bag 77 for highly volatile liquid cargo are also suspended. The discharge head 66 is connected to bag 77 in a manner similar to the other figures except that liquid withdrawal tube 78 is flexible and is pushed to one side along with the folds of bag 77 by lifting hinged bottom plate 79 about hinge 81 as shown by the dotted lines in the form of an arc. Refrigeration pipes 82 are preferably recessed in the inner portion of heat insulation 69 for the purpose of preventing the perishable, dry cargo 61, 72 and 73 from spoiling at atmospheric temperatures. These refrigerant coils 82 are useful when the dry cargo 70, 72, and 73 is removed and hinged bottom plate 79 is lowered and bag 77 is filled with L.P.G., which when refrigerated can be kept at substantially atmospheric pressure, so that the construction of bag 77, insulation 69, and ship 67 need not be as strong as it would have to be if the L.P.G. were at atmospheric temperature and resulting high vapor pressure.

Figure 3:
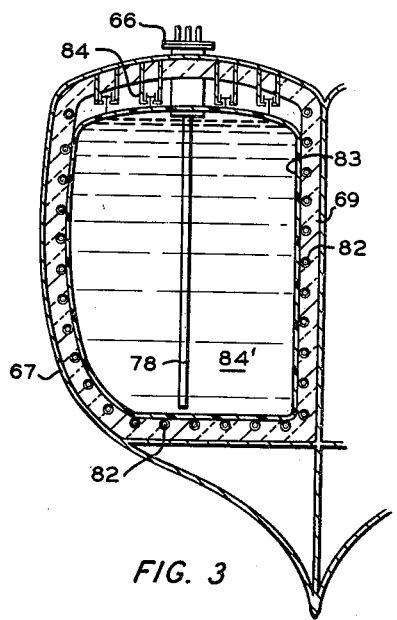
FIGURE 3 is a view similar to that of FIGURE 2 of a third modified form of cargo hold.

FIGURE 3 is a view similar to that of FIGURE 2 of a third modified form of cargo hold in which the pliable, flexible, impervious bag 83 is supported from tracks 84 running fore and aft, bag 83 being shown full of L.P.G. 84' kept under substantially atmospheric pressure by refrigeration 82 and heat insulation 69.

Figure 4:
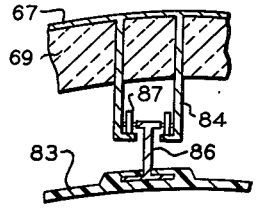
FIGURE 4 is an enlarged view of the trolley details shown in FIGURE 3.

In FIGURE 4 is shown an enlarged view of a trolley 86 and track 84 by which bag 83 is supported in FIGURE 3. Trolley 86 is preferably provided with wheels 87 to reduce friction, which friction may be further reduced by providing roller bearings (not shown) of conventional construction in the hubs of wheels 87.

In FIGURE 5 the filling and discharge head 66 is shown in greater detail. Head 66 is provided with a flange 88 and a telescopic inner sleeve 89 having a flange 91. The flexible, impervious bag 92 has a hole surrounding sleeve 89 and the edges of the bag surrounding said hole are clamped between the flanges 88 and 89 and the telescopic inner sleeve 89 fastened in position in outer head 66 by set screw 93, which clamps sleeve 66 to the inner sleeve 89. Three pipes 78, 94, and 96 are connected in communication with the interior of bag 92. Pipe 78 runs almost to the bottom of the bag 92 in order to act as a liquid withdrawal line. Pipe 94 is connected at the top of tank 92 as a gas withdrawal line, or inlet, for either liquid or gas. It is customary to have line 96 attached to the top of bag 92 with a relief valve 97 therein leading to a suitable vent stack 98 to relieve excess pressures if they arise inside bag 92. The mechanical means for collapsing and expanding bag 92 in the fourth species shown in FIGURE 5 comprises a plurality of pull ropes 99, 101, 102, and 103 at one end of the bag and 104, 106, 107, and 108 at the other end of the bag. All these pull ropes may pass around suitable pulleys 109. By pulling on lines 99, 101, 102 and 103 simultaneously and releasing corresponding links of lines 104, 106, 107 and 108, the accordion pleats 109 of bag 92 will be expanded and the head 111 drawn to the right by means of transverse pulling bars 112, 113, 114, and 115, respectively. Ropes 99, 101, 102 and 103 can be connected at any point on the transverse pulling bars, but the ropes 104, 106, 107 and 108 are secured at the ends of bars 112, 113, 114 and 115 and pass to pulleys 109 on the exterior of bag 92. The usual refrigeration pipe 61 and heat insulation 46 and 47 is provided in a manner similar to the other figures of the drawing.

Figure 6:
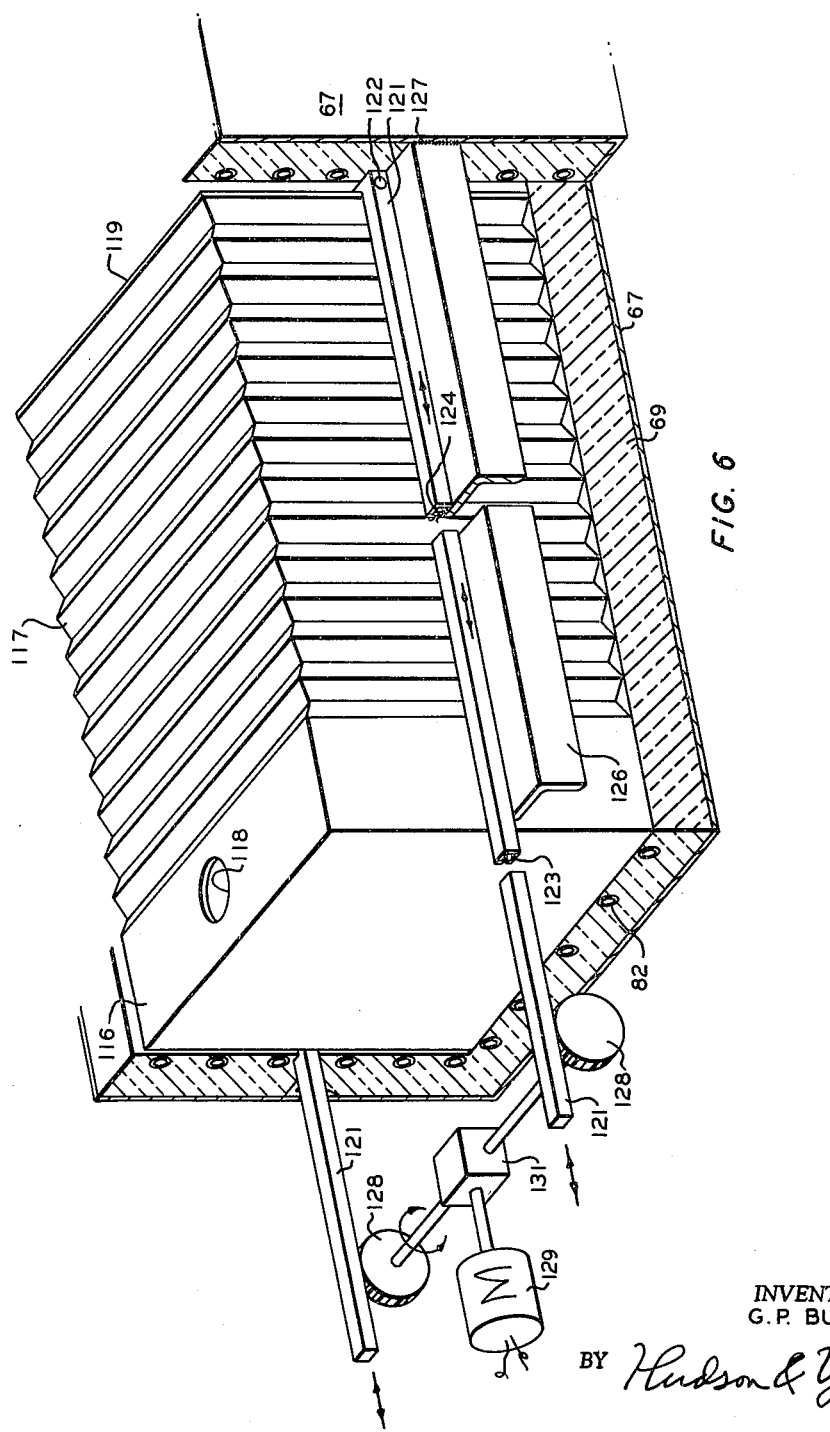
FIGURE 6 is a fifth type of cargo hold shown in perspective, with parts broken away to show the operation and construction more clearly.

In FIGURE 6 is shown a fifth species of flexible bag 116 having accordion pleats 117. Bag 116 is provided with a hole 118 for receiving hydraulic connection 66 of the other figures. Bag 116 has one end secured against movement by connection 66 and the other end is secured to a stiffener plate 119. Plate 119 is secured to a moveable rack bar 121 by pins 122. The moveable rack bar 121 may contain a guide channel 123 in its interior for guiding a plurality of pins 124 spaced along the accordion pleats 117 of the bag. The rack bars 121 slide on rails 126 which may be secured by welding 127 to the wall of the ship. Heat insulation 69 is provided along the refrigeration pipes 82 as in the other figures. The rack bars 121 are driven to and fro by pinion wheels 128 driven by a motor 129 through a gear box 131 as indicated by the double headed arrows on the bars 121. As in the other figures, the mechanical means 121, 128 and 129 for converting the cargo hold from dry storage to liquid storage space obviously can be operated in a minimum of time with a minimum of work and with minimum preparation of space to receive the different types of cargo. Because of this mechanical means for converting the space, it is unnecessary to have to steam, purge, and dry the interior of the L.P.G.-containing bag or tank 116, and it is also unnecessary to allow any air to enter into the tank 116 thereby reducing the danger of explosion which occurs whenever L.P.G. is flowing into a space containing air. In addition, the refrigeration pipes 82 enable the L.P.G. in tank 116 to be stored at substantially atmospheric pressure, in a tank of much less thickness and strength than would be required to contain the vapor pressure of propane at atmospheric temperature; and furthermore, when tank 116 is mechanically collapsed refrigeration at 82 provides for the transportation of perishable, dry cargo, such as meat, butter, and eggs without danger of being spoiled at atmospheric temperature during a long sea voyage.

While certain specific examples have been shown for the purpose of illustrating the invention, it is obvious that the invention is not limited thereto.

Having described my invention, I claim:

1. A cargo vessel having a hold therein, a layer of heat insulating material surrounding said hold, said hold having a floor and walls, a closed cycle refrigeration system in said vessel with its cooling pipes disposed inside said layer of insulating material to cool said hold, an accordion-folded, impervious, flexible bag mounted and disposed to expand and contract along a substantially horizontal axis in said hold, and means to expand and contract said bag along said axis to provide liquid cargo space inside said bag and dry cargo space outside said bag as desired, whereby said contraction will provide a clear space on said floor at one end of said bag for said dry cargo without the weight of said dry cargo resting on said bag.

2. A cargo vessel having a hold therein having a floor and walls, a lining of heat insulating material in said hold, a closed cycle refrigeration system with cooling pipes inside said lining, an accordion-folded, impervious, flexible bag mounted and disposed to expand and contract along a horizontal axis in said hold, and means to expand and contract said bag along said axis in said hold to provide liquid cargo space inside said bag and dry cargo space outside said bag as desired, whereby said contraction along said horizontal axis provides a clear space on said floor to one side of said bag so that said floor supports said dry cargo independently of said bag without said dry cargo resting on top of said bag.

References Cited in the file of this patent

UNITED STATES PATENTS

| | | |
|---|---|---|
| Re. 22,876 | Gray et al. | May 13, 1947 |
| 2,783,624 | Morrison | Mar. 5, 1957 |
| 2,795,937 | Sattler et al. | June 18, 1957 |
| 2,845,890 | Dameron et al. | Aug. 5, 1958 |

FOREIGN PATENTS

| | | |
|---|---|---|
| 1,079,634 | France | May 19, 1954 |
| 1,170,576 | France | Sept. 22, 1958 |

OTHER REFERENCES

"The British Motor Ship" issue of June 1956, page 75 relied on.